United States Patent [19]

Hesky et al.

[11] 4,206,073
[45] Jun. 3, 1980

[54] PROCESS FOR SEPARATING VOLATILE, RADIOACTIVE SUBSTANCES OBTAINED IN THE REPROCESSING OF NUCLEAR FUEL

[75] Inventors: Hans Hesky, Runkel; Armin Wunderer, Hofheim am Taunus, both of Fed. Rep. of Germany

[73] Assignee: Hoechst Aktiengesellschaft, Frankfurt, Fed. Rep. of Germany

[21] Appl. No.: 886,516

[22] Filed: Mar. 14, 1978

[30] Foreign Application Priority Data

Mar. 16, 1977 [DE] Fed. Rep. of Germany ....... 2711368

[51] Int. Cl.² .............................................. G21F 9/02
[52] U.S. Cl. .................................. 252/301.1 W; 55/66; 55/68; 55/71; 423/210; 423/219; 423/235; 423/249
[58] Field of Search ................... 252/301.10; 423/210, 423/249, 262, 219, 235; 55/66, 68, 71

[56] References Cited

U.S. PATENT DOCUMENTS

| | | | |
|---|---|---|---|
| 2,994,577 | 8/1961 | Silverman | 423/241 |
| 4,012,490 | 3/1977 | Lofredo | 252/301.1 W |
| 4,055,625 | 10/1977 | Faugeras et al. | 252/301.1 W |
| 4,080,429 | 3/1978 | Koeppe et al. | 252/301.1 W |

OTHER PUBLICATIONS

Brown, R. M. et al, "The Determination of Tritium in Natural Waters, ", Can. J. Chem., 34, pp. 220-226 (March 1956).

Primary Examiner—Benjamin R. Padgett
Assistant Examiner—Deborah L. Kyle
Attorney, Agent, or Firm—Curtis, Morris & Safford

[57] ABSTRACT

Volatile, radioactive substances, obtained in the reprocessing of nuclear fuel and contained in the gas mixtures formed and in the liquid wastes are retained and separated in several stages. In the first stage the higher nitrogen oxides contained in the gas mixtures formed in the dissolution of the nuclear fuel with nitric acid and in the denitration of the uranium and plutonium nitrates are reduced to nitric oxide (NO) and iodine is absorbed. In the second stage, the gas mixture of the first stage is separated into a fraction containing the volatile, radioactive substances and nitric oxide and a fraction mainly consisting of nitrogen and xenon. Oxygen is added to the liquid, radioactive substances and enriched with volatile, radioactive substances. The enriched oxygen and the fraction of the second stage consisting of volatile, radioactive substances and nitric oxide are jointly subjected to a chemical treatment and the oxygen is reacted with the nitric oxide. The reaction product formed is recycled into the reprocessing.

8 Claims, 1 Drawing Figure

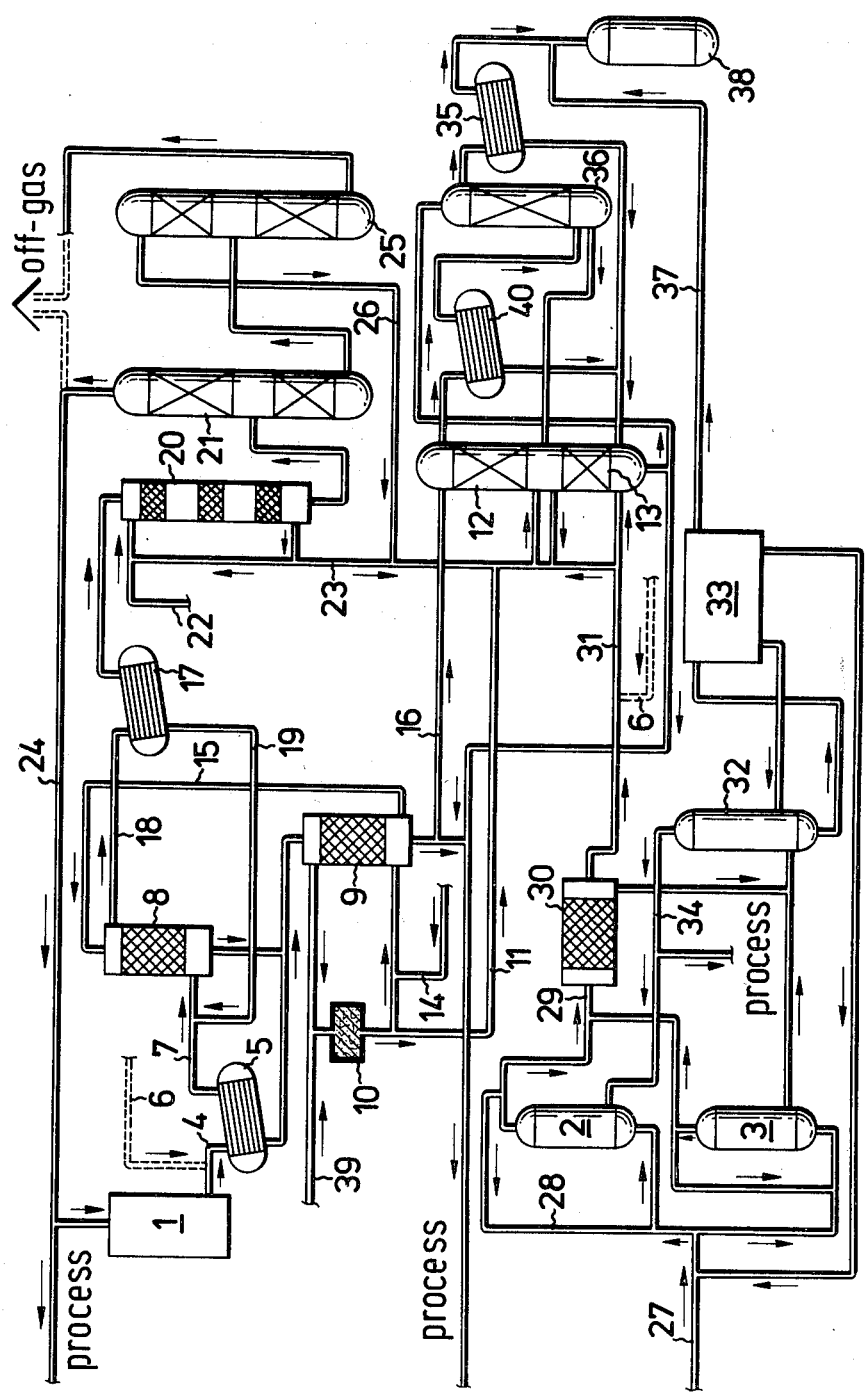

PROCESS FOR SEPARATING VOLATILE, RADIOACTIVE SUBSTANCES OBTAINED IN THE REPROCESSING OF NUCLEAR FUEL

It is the object of this invention to provide a process to retain volatile, radioactive substances as formed in the reprocessing of nuclear fuel. By reprocessing of nuclear fuel there is to be understood in the following text the reprocessing of spent fuel and the reprocessing of unusable nuclear fuel (faulty charges). Volatile, radioactive substances shall include gaseous, vaporous, solid and liquid suspended matter.

For reprocessing nuclear fuel is mechanically comminuted and dissolved in nitric acid. The apparatus for mechanical comminution is scavenged with nitrogen. When the nuclear fuel is dissolved in nitric acid volatile, radioactive substances are obtained besides other radioactive substances. The volatile, radioactive substances are partly contained in the gas mixture formed in the dissolution. Uranium and plutonium nitrate and unreacted nitric acid are separated from the solution obtained. The remaining solution, which must be stored, contains or produces also volatile, radioactive substances. In the reprocessing of the unreacted and separated nitric acid tritium-containing water is obtained which must be isolated and stored. This tritium-containing water likewise contains and produces volatile, radioactive substances. The stored remaining solution and the stored tritium-containing water are called radioactive liquid wastes. Volatile, radioactive substances are also formed in the denitration of the uranium and plutonium nitrates and of the radioactive, liquid wastes.

The volatile radioactive substances mainly consist of krypton, tritium, iodine, aerosols and compounds of ruthenium plutonium, americium, caesium, strontium and cerium. They are admixed with their non radioactive isotopes, contaminated nitrose, i.e. a mixture of $NO+NO_2$, with vapors of nitric acid and water, with noble gases and with nitrogen. On the one hand, the volatile, radioactive substances cannot be recycled into the reprocessing since they would concentrate, and, on the other, they cannot be passed into the atmosphere for reasons of environmental protection.

It is, therefore, the object of the present invention to separate the volatile radioactive substances from the other gases so that they can be passed to a controlled storage.

It is another object of the invention to work up the remaining contaminated gases in such a manner that they can be recycled into the reprocessing.

To solve this problem, the invention provides a process for separating volatile, radioactive substances obtained in the reprocessing of nuclear fuel, which comprises:

(a) reducing the higher nitrogen oxides formed in the dissolution and the denitration and contained in the respective gas mixtures to give nitric oxide (NO) and absorbing the iodine contained in the gases;
(b) separating the gas mixture obtained into a first fraction containing the volatile radioactive substances and nitric oxide, a second fraction essentially consisting of nitrogen and a third fraction consisting of xenon;
(c) adding oxygen to the liquid, radioactive wastes and separating the oxygen enriched with the volatile radioactive substances from said wastes;
(d) subjecting to a chemical treatment the enriched oxygen of stage (c) together with the first fraction of stage (b) and reacting the oxygen with the nitric oxide and water of the aqueous nitric acid to form nitric acid;
(e) conducting the reaction product of stage (d) obtained into the dissolution process and passing the volatile, radioactive substances to a common storage.

When the volatile, radioactive substances obtained in the denitration do not contain nitrogen, the process can be modified as follows:

(a) the higher nitrogen oxides formed in the dissolution and contained in the gas mixture are reduced to nitric oxide (NO) and the iodine is absorbed;
(b) the gas mixture obtained from stage (a) is separated into a first fraction containing the volatile, radioactive substances, nitric oxide and a second fraction essentially consisting of nitrogen and a third fraction consisting of xenon;
(c) oxygen is added to the liquid, radioactive wastes and the oxygen enriched with the volatile, radioactive substances is separated from said wastes;
(d) the enriched oxygen of stage (c) and the first fraction of stage (b) are subjected to a chemical treatment together with the gas mixture obtained in the denitration and the oxygen is reacted with the nitric oxide and water of the aqueous nitric acid to form nitric acid;
(e) the reaction product of stage (d) is conducted into the dissolution process and the volatile, radioactive substances are commonly stored.

In the reduction of the higher nitrogen oxides to nitric oxide nitric acid is formed which absorbs iodine. The nitric acid contaminated with iodine is subjected to an iodine desorption, the desorbed iodine is blown out with oxygen and passed to an iodine filtration. The oxygen leaving the filtration can be combined with the contaminated oxygen set free from the liquid radioactive waste.

It may be expedient to pass the gas mixture leaving the reduction stage through an adsorber chain to be regenerated with oxygen. In this adsorber chain aerosols, carbon dioxide and suspended matter which may be present inter alia are retained. The oxygen used for the regeneration can be combined with the contaminated oxygen set free from the liquid, radioactive waste.

It proved advantageous to concentrate by distillation with subsequent electrolysis the radioactive liquid wastes essentially consisting of tritium-containing water, formed in the recovery of nitric acid which has not been consumed. For concentration there may also be used a distillation and/or an electrolytic enrichment cascade.

Still further, it can be of advantage to pass the oxygen contaminated with radioactive substances and set free from the liquid radioactive wastes over a catalyst to convert tritium-containing hydrogen formed by radiolysis to tritium-containing water. The tritium-containing water formed can then be subjected to an electrolytic enrichment process and the water depleted of tritium can be recycled into the reprocessing, for example into the dissolution process or it can be used to adjust the concentration of nitric acid.

The contaminated oxygen which has not been reacted in the catalytic hydrogen oxidation can be subjected to a chemical treatment together with the fraction containing the volatile, radioactive substances, essentially krypton, and nitric oxide. It proved also advantageous to recycle the separated nitrogen at least partly as scavenging gas into the comminution and dissolution of the nuclear fuel.

In order to retain traces of iodine, if any, the separated xenon can be passed through an appropriate filter and released into the atmosphere or it can be utilized for a convenient purpose. As far as the nitrogen is to be released into the atmosphere, it should be passed through an appropriate filter to remove and isolate traces of iodine possibly present and, if tritium is still contained in the nitrogen, it should be subjected to an appropriate further after-purification, for example a tritium oxidation.

It is the advantage of the process of the invention that for the sequestration of volatile, radioactive substances obtained in the reprocessing of nuclear fuel only oxygen need be added which is reacted with the NO formed in the process to give higher nitrogen oxides. A further advantage resides in the fact that the gas mixtures remain in the process and that chiefly only xenon, the excess amount of nitrogen and the volatile, radioactive substances are withdrawn from the cycle. The common storage of krypton and tritium constitutes a further advantage since tritium forms a solid with rubidium, a decomposition product of krypton, so that the stored volume and hence the storage pressure are reduced. Still further, it is of advantage that all volatile, radioactive substances to be withdrawn from the process are jointly obtained at one point and can be stored.

The invention will now be described in detail and by way of example with reference to the accompanying flow sheet.

Referring to the drawing, the dissolving unit 1 consists of a mechanical comminution apparatus for the spent fuel, scavenged with nitrogen ($N_2$) and the dissolution tank in which the comminuted nuclear fuel is dissolved in nitric acid. In the dissolving unit gas mixtures and a liquid mixture are obtained. The gas mixtures contain volatile, radioactive substances. After separation of uranium and plutonium nitrates and nitric acid which has not been consumed, liquid, radioactive wastes remain behind which are stored in container 2. In the working up—not shown—of the nitric acid separated from the solution there is also obtained a liquid, radioactive waste which mainly consists of tritium-containing water and which is stored in container 3. Further volatile, radioactive substances are formed in the denitration of the uranium and plutonium nitrates and in the further treatment of the radioactive, liquid wastes—not shown.

The gas mixture leaving the dissolving unit via conduit 4, essentially consisting of steam, nitric acid fumes, nitrogen, nitrogen oxides, xenon, krypton, iodine, tritium, aerosols and suspended matter, is passed through a condenser 5, optionally together with the gas mixture from the denitration. The gas mixture from the denitration, essentially consisting of nitrogen oxides, aerosols, iodine and suspended matter is introduced into conduit 4 through conduit 6. In condenser 5 steam and nitric acid fumes are condensed and in the condensate iodine concentrates. The gases leaving condenser 5 are introduced into absorber 8 through conduit 7. In absorber 8 iodine and $NO_2$ are absorbed in the liquid phase essentially consisting of aqueous nitric acid. The liquid phase of absorber 8 and the condensate of condenser 5 are freed from iodine in an iodine desorber 9. The iodine is expelled from desorber 9 by means of oxygen and passed to an iodine filtration 10. The oxygen can be conducted in a cycle and/or it is passed through conduit 11 into a two-stage chemical treatment 12/13. The oxygen for the desorber cycle is replenished via conduit 14. If the oxygen is charged with iodine in another place of the process, it is suitably introduced into the desorber cycle via conduit 39. The nitric acid obtained in desorber 9 is introduced, partly into the head of absorber 8 via conduit 15, partly into the head of stage 12 of the chemical treatment 12/13 via conduit 16 and partly into the process, for example the dissolving unit 1. The gases leaving absorber 8 through conduit 18 are freed in condenser 17 from any residual amounts of higher nitrogen oxides, which are recycled through conduit 19 into conduit 7, the gas inlet into absorber 8. The gas from condenser 17 is passed through a cooling and adsorption unit 20 and introduced into a separating column 21. The cooling and adsorption unit 20 is regenerated with oxygen fed through conduit 22, optionally recycled and passed into the chemical treatment 12/13 through conduit 23. At the head of separating column 21 mainly nitrogen ($N_2$) is withdrawn from which traces of krypton and tritium can be removed by adsorption or oxidation—not shown—or the nitrogen is returned into the process, for example dissolving unit 1 via conduit 24. The fraction of nitric oxide (NO), krypton and xenon, obtained in the sump of column 21, is separated in separating column 25 into xenon as sump product and a gas mixture composed of krypton and nitric oxide. Depending on the intended use of the xenon, and after-purification to eliminate the last traces of iodine—not shown—may become necessary. The mixture of krypton and NO is passed through conduit 26 into the chemical treatment 12/13.

Into the liquid, radioactive wastes stored in containers 2 and 3 oxygen is introduced through conduit 27. In container 2 the oxygen serves to keep in motion the contents so that no local concentrations of radioactive matter can occur. Simultaneously, volatile, radioactive substances are drawn out of container 2 together with the oxygen. A partial current of the expelled and contaminated oxygen may be recycled through conduit 28 in order to keep as low as possible the consumption of fresh oxygen. The volatile, radioactive substances of container 3, essentially consisting of tritium, are also expelled together with the oxygen. The gas current, as far as it is not returned into container 3, is combined with the contaminated oxygen of container 2 and passed through conduit 29 into a catalytic hydrogen combustion unit 30. The oxygen freed from hydrogen by catalytic hydrogen combustion and charged with the volatile, radioactive substances is introduced into the chemical treatment 12/13 through conduit 31. The tritium-containing water obtained as condensate can be fed, together with the tritium-containing water from container 3, to a tritium water enrichment unit 32 with series connected electrolytic processing unit 33. The tritium depleted water obtained at the head of column 32 can be recycled through conduit 34 into the process, for example for adjusting the acid concentration or the concentration of the solution in container 2. The oxygen from the electrolytic processing 33 can be introduced into conduit 27.

In the chemical treatment 12/13 the gas mixture consisting of krypton and NO is treated with oxygen and/or nitric acid, whereby the nitric oxide is oxidized to higher nitrogen oxides, which are condensed in series connected condensers 35 and 40. If the volatile, radioactive substances still contain traces of nitrogen oxides, these may be separated in series connected adsorbers not shown. The volatile, radioactive substances are introduced into a gas or liquid tank 38. The nitric acid obtained in the two-stage chemical treatment 12/13 can be recycled into the dissolving unit 1 or any other place of the nuclear fuel and gas processing.

In order to avoid ozone formation in the liquefaction of the volatile radioactive substances the oxygen introduced into the chemical treatment 12/13 must be consumed quantitatively. Simultaneously, the nitrogen oxide should be transformed substantially into nitric acid, so that additional auxiliaries, such as hydrogen or ammonia, which would increase the amount of contaminated substances, need not be introduced into the process. In order simultaneously to satisfy these two requirements, a column 36 for the syn-proportionation of the nitric oxide (NO) can be inserted between the two-stage chemical treatment 12/13 and condenser 35. The nitric acid withdrawn from the sump of stage 13 of the chemical treatment 12/13 is introduced into the head of said column 36 and conducted in countercurrent flow with the head product of stage 12 of the chemical treatment 12/13, which, after condensation, is introduced into the lower section of column 36. The sump of column 36 is introduced into the head of stage 13 of the chemical treatment 12/13. The stoichiometric amount of oxygen required for the reaction of the NO is fed to the chemical treatment stage 12/13 in such a manner that in part 12 a deficiency and in part 13 an excess thereof prevails.

In the case of the gas mixture leaving the denitration being free from nitrogen, conduit 6, instead of joining conduit 4, can lead into conduit 11, 26 or 31.

What is claimed is:

1. A process for separating and sequestering volatile, radioactive substances obtained in the reprocessing of nuclear fuel and contained in the gas mixtures formed in the dissolution of said nuclear fuel with nitric acid, in the storage and the further treatment of the radioactive liquid wastes remaining after the separation of uranium and plutonium and in the processing of unreacted nitric acid, and in the denitration of the uranium and plutonium nitrates, which comprises
   (a) reducing absorbing iodine and the higher nitrogen oxides formed in the dissolution and the denitration and contained in the respective gas mixtures in aqueous nitric acid to give a gas mixture containing nitric oxide (NO);
   (b) separating the gas mixture obtained from stage (a) into a first fraction containing the volatile radioactive substances and nitric oxide, a second fraction essentially consisting of nitrogen and a third fraction consisting of xenon;
   (c) adding oxygen to the radioactive liquid wastes and separating the oxygen enriched with the volatile radioactive substances from said wastes;
   (d) combining the enriched oxygen of stage (c) together with the fraction of stage (b) containing the volatile radioactive substances and nitric oxide and reacting the oxygen with said nitric oxide and water of the aqueous nitric acid to form nitric acid;
   (e) conducting the reaction product of stage (d) into the dissolution process and passing the volatile radioactive substances to a common storage.

2. Process for separating and sequestering volatile, radioactive substances obtained in the reprocessing of nuclear fuel and contained in the gas mixtures formed in the dissolution of said nuclear fuel with nitric acid, in the storage and the further treatment of the radioactive liquid wastes remaining after the separation of uranium and plutonium and in the processing of unreacted nitric acid, and in the denitration of the uranium and plutonium nitrates, wherein
   (a) iodine and the higher nitrogen oxides formed in the dissolution and contained in the gas mixture are absorbed in aqueous nitric acid to give a gaseous mixture containing nitric oxide (NO);
   (b) the gas mixture obtained from stage (a) is separated into a first fraction containing the volatile radioactive substances and nitric oxide, a second fraction essentially consisting of nitrogen and a third fraction consisting of xenon;
   (c) oxygen is added to the liquid radioactive wastes and the oxygen enriched with the volatile radioactive substances is separated from said wastes;
   (d) the enriched oxygen of stage (c) and the first fraction of stage (b) are combined with the gas mixture obtained in the denitration and the oxygen is reacted with the NO and water of the aqueous nitric acid to form nitric acid;
   (e) the reaction product of stage (d) is conducted into the dissolution process and the volatile radioactive substances are commonly stored.

3. The process as claimed in claims 1 or 2, wherein the absorbed iodine is desorbed, expelled with oxygen, passed to an iodine filtration and the filtered oxygen is combined with the enriched oxygen of stage (c).

4. The process as claimed in claims 1 or 2, wherein the gas mixture obtained in stage (a) is passed to stage (b) via an adsorber chain to be regenerated with oxygen and the oxygen used for regeneration is combined with the enriched oxygen of stage (c).

5. The process as claimed in claims 1 or 2, wherein the radioactive liquid wastes obtained in the nitric acid recovery are concentrated by distillation with subsequent electrolysis.

6. The process as claimed in claim 5, wherein the radioactive liquid wastes are concentrated in an electrolytic enrichment cascade.

7. The process as claimed in claims 1 or 2, wherein the contaminated oxygen of stage (c) having tritium-containing hydrogen therein is passed through a catalyst to convert said hydrogen to water, the unreacted contaminated oxygen is passed on to stage (d) and the tritium-containing water obtained from the catalytic hydrogenation is introduced into an electrolytic concentration system and the water depleted of tritium is returned to the storage of the radioactive liquid wastes.

8. The process as claimed in claims 1 or 2, wherein the nitrogen of stage (b) is recycled at least partly into the dissolution stage.

* * * * *